US009605389B1

(12) United States Patent
Smith

(10) Patent No.: US 9,605,389 B1
(45) Date of Patent: Mar. 28, 2017

(54) REVETMENT BLOCK MAT USING TOE BLOCKS WITH LINEAR SIDES

(71) Applicant: Lee A. Smith, Houston, TX (US)

(72) Inventor: Lee A. Smith, Houston, TX (US)

(\*) Notice: Subject to any disclaimer, the term of this patent is extended or adjusted under 35 U.S.C. 154(b) by 0 days.

(21) Appl. No.: 15/268,866

(22) Filed: Sep. 19, 2016

Related U.S. Application Data

(62) Division of application No. 14/934,359, filed on Nov. 6, 2015, now Pat. No. 9,499,950.

(60) Provisional application No. 62/123,095, filed on Nov. 6, 2014.

(51) Int. Cl.
| E01C 5/00 | (2006.01) |
| E02B 3/14 | (2006.01) |
| E01C 19/52 | (2006.01) |
| E01C 9/00 | (2006.01) |
| E01C 5/06 | (2006.01) |

(52) U.S. Cl.
CPC ............... E01C 5/00 (2013.01); E01C 19/52 (2013.01); E02B 3/14 (2013.01); *E01C 5/06* (2013.01); *E01C 9/004* (2013.01); *E01C 2201/16* (2013.01)

(58) Field of Classification Search
CPC . E02B 3/14; E02B 3/123; E02B 3/126; E02D 17/205; E01C 5/00; E01C 5/04; E01C 5/06; E01C 3/006; E01C 2201/16
USPC ....... 52/102, 311.2, 590.2, 604, 610, 741.11; 405/16, 17, 20; 404/34, 35, 41; 428/53; 273/160, 157 R
See application file for complete search history.

(56) References Cited

U.S. PATENT DOCUMENTS

| 257,613 | A | | 5/1882 | Richardson |
| 378,000 | A | | 2/1888 | Gibford |
| 725,983 | A | | 4/1903 | Nash |
| 777,860 | A | | 12/1904 | Nash |
| 777,861 | A | | 12/1904 | Nash |
| 777,862 | A | * | 12/1904 | Nash ........................ E01C 3/006 404/29 |
| 1,244,008 | A | * | 10/1917 | Wheeler .................. E01C 5/00 404/34 |
| 1,280,995 | A | | 10/1918 | Harris |
| RE14,904 | E | * | 6/1920 | Wheeler .................. E01O 5/00 404/34 |
| 1,379,440 | A | | 5/1921 | Brainerd |
| 1,473,639 | A | | 11/1923 | Page |
| 1,636,114 | A | | 7/1927 | Streator |
| 1,677,829 | A | | 7/1928 | Jack |
| 2,192,369 | A | * | 3/1940 | Sparrow ................. E01C 3/006 404/3 |
| 2,472,363 | A | | 6/1949 | Blackinton |
| 2,545,046 | A | | 3/1951 | Rownd |
| 2,953,380 | A | | 9/1960 | Hassenbach |
| 2,999,431 | A | | 9/1961 | Mitchell |

(Continued)

FOREIGN PATENT DOCUMENTS

GB      2 172 638      9/1986

*Primary Examiner* — Robert Canfield
(74) *Attorney, Agent, or Firm* — Roger N. Chauza, PC

(57) ABSTRACT

A mat of revetment blocks formed with interior revetment blocks having interlocking arms and sockets. The mat has opposing sides formed with revetment toe blocks having either an arm or socket that interlocks with a socket or arm of the interior revetment blocks. The toe blocks each have an outer linear edge that forms a linear border of the mat. The toe blocks rest on respective anchor portions that extend into the ground. The mat can be used to form a roadway.

17 Claims, 6 Drawing Sheets

(56) References Cited

U.S. PATENT DOCUMENTS

| | | | |
|---|---|---|---|
| 3,347,048 | A | 10/1967 | Brown et al. |
| 4,047,825 | A | 9/1977 | Lundahl |
| 4,499,664 | A | 2/1985 | Scales |
| 5,409,325 | A | 4/1995 | Wu |
| 5,556,228 | A | 9/1996 | Smith |
| 6,079,902 | A | 6/2000 | Pettee, Jr. |
| 6,276,870 | B1 | 8/2001 | Smith |
| 6,508,607 | B1 | 1/2003 | Smith et al. |
| 6,955,500 | B1 | 10/2005 | Smith et al. |
| 7,037,037 | B1 | 5/2006 | Smith et al. |
| 8,123,434 | B1 | 2/2012 | Smith |
| 8,123,435 | B1 | 2/2012 | DeShaw et al. |
| 8,678,704 | B1 | 3/2014 | Smith et al. |
| 8,678,705 | B1 | 3/2014 | Smith et al. |
| 2009/0217601 | A1* | 9/2009 | Perotti .................... E01F 9/535 52/102 |
| 2011/0286793 | A1 | 11/2011 | Arguello |
| 2014/0270945 | A1 | 9/2014 | Bach |

* cited by examiner

REVETMENT BLOCK MAT USING TOE BLOCKS WITH LINEAR SIDES

RELATED APPLICATION

This new non-provisional patent application is a divisional patent application of pending U.S. non-provisional application Ser. No. 14/934,359 filed Nov. 6, 2015, which claims the benefit of provisional application 62/123,095, filed Nov. 6, 2014.

TECHNICAL FIELD OF THE INVENTION

The present invention relates in general to revetment blocks for controlling erosion, and more particularly to a mat of interlocking revetment blocks in which the perimeter thereof is linear and does not have either interlocking arms or sockets around the border.

BACKGROUND OF THE INVENTION

Erosion control blocks protect the underlying ground against erosion of the soil and maintain the terrain in a desired condition. Interlocking erosion control blocks are well adapted for protecting the ground, as such type of blocks are constructed with interlocking arms that extend from one or more sides of a block, and interlocking sockets formed in other sides of the block. When interlocked together, neighbor blocks cannot be laterally moved from each other, thereby allowing high water flows thereover without compromising the integrity of a mat of blocks.

An interlocking revetment block generally has at least four sides with at least one interlocking arm or an interlocking socket on each side. Often, the corners of the revetment block are formed at an angle so that overall the block has an octagonal shape. Such a revetment block is disclosed in U.S. Pat. No. 5,556,228 by Smith. As can be appreciated, if a mat of such type of revetment blocks were installed, then the perimeter or border would have exposed interlocking arms and unfilled interlocking sockets. The irregular edge of the block with unused arms or sockets allows the border blocks to more easily break or allow cracks to form through the block.

Interlocking revetment blocks are also formed with one or more vertical holes formed therein, from the top surface to the bottom surface. The vertical holes allow vegetation to grow therein and help anchor the block to the ground. A revetment block that has five vegetation holes therein is disclosed in U.S. Pat. No. 8,123,435, also by Smith.

Revetment blocks are often installed in watershed areas where soil erosion is to be prevented. The watershed areas are in many instances located in areas controlled by local or federal governments, and the primary concern is the long term protection of such areas from the erosion of soil due to frequent high-volume flows of rainwater, and the like. Generally, the aesthetics of such an area is not a concern, as the prevention of erosion is the primary goal to be achieved.

Generally, large areas of revetment blocks are installed using a single type or style of block. The use of two different types of blocks is usually not an alternative that is available because two different types of blocks must be maintained either in inventory, or must be fabricated for the project. For example, if an area to be protected from erosion requires the borders to be linear and without unused interlocking arms or sockets, then different shaped blocks must be employed. The fabrication of different style interlocking blocks necessitates the use of different shape molds at the fabrication plant.

Revetment blocks are typically fabricated with heavy duty steel molds that are repeatedly used, thus making such molds expensive. Moreover, if a different style revetment block is to be fabricated, this requires that the entire female mold and male press head be removed and replaced with a different mold and press head adapted for fabricating the different shape block. This results in more costly revetment block products.

From the foregoing, it can be seen that a need exists for a mat of interlocking revetment blocks where the perimeter thereof is linear and devoid of interlocking arms or sockets. Another need exists for a mat of interlocking revetment blocks that has a linear perimeter so that it easily abuts against a linear border of concrete, such as a paved road, sidewalk, etc. Yet another need exists for a mat of interlocking revetment blocks that has a linear border, so that such mat can be used as a roadway and the perimeter is less likely to deteriorate and more likely to remain intact, even with heavy equipment traffic running over the edges of the mat. A further need exists for an economical method of fabricating different style revetment blocks using a universal mold where various components can be fastened or removed from the male and female mold parts, without changing out the entire mold.

SUMMARY OF THE INVENTION

In accordance with the principles and concepts of the invention, disclosed are different style revetment blocks that can be installed and interlocked so that there is a linear border around at least a portion of the area covered by such blocks. In a preferred embodiment, in which the perimeter of the area to be covered is linear, the revetment blocks include border blocks with a linear side, corner blocks with two linear sides, and interior blocks that interlock with each other as well as the border and corner blocks.

A feature of the invention is that a mat of the revetment blocks can be installed in abutment with a concrete curb or other linear edge, so that there is no unused interlocking arms or sockets on the desired borders of the perimeter of the area to be covered. With this arrangement, there is less chance that the border blocks will break or crack when subjected to heavy loads. Otherwise, the unused arms or sockets that are not interlocked with other blocks could crack or break and degrade the integrity of the mat.

An additional feature of the invention is that the revetment blocks are constructed with positive interlocking arms and sockets so that the blocks cannot be separated from each other by substantial lateral movement. The positive interlocking aspect allows the blocks to be individually removed only by upward lifting of a block. A mat of such revetment blocks can thus withstand substantial hydraulic forces of water flowing thereover without compromising the stability of the mat of blocks.

A universal mold can be employed to efficiently and economically fabricate the different types of revetment blocks required to construct a mat of blocks having a linear border. The mold includes a female mold body and a male press head, each with arm and socket components that can be attached or removed to reconfigure the mold to fabricate the different types of revetment blocks. The mold body and press head can be easily modified with the arm and socket components so that the entire mold parts do not have to be replaced, thereby allowing multiple types of revetment blocks to be fabricated by a single reconfigurable mold, without having to have entirely different molds, which would be expensive.

According to an embodiment of the invention, disclosed are revetment blocks for making a mat having a linear border. An interior block has two engaging arms and two engaging sockets, the arms for engaging with respective sockets of two neighbor revetment blocks, and the sockets for engaging with respective arms of two other neighbor blocks. A border block has three engaging members for interlocking with respective members of three neighbor revetment blocks. The border block has a linear edge forming a portion of the border of the mat. A corner border block has two engaging members for engaging with the respective members of two border blocks. The corner block has two linear sides.

According to another embodiment of the invention, disclosed are revetment blocks for making a mat having a linear border. The mat includes a plurality of interior revetment blocks, each having two engaging arms and two engaging sockets for engaging with respective neighbor revetment blocks. A first revetment toe block has a socket for engaging with an arm of one of the interior blocks, where the first toe block has a linear edge without an arm or a socket on a side opposite the socket of the first toe block. A second revetment toe block has an arm for engaging with a socket of one of the interior blocks, where the second toe block has a linear edge without an arm or a socket on a side opposite the arm of the second toe block. The first toe block and the second toe block are adapted for laying on a ground surface to be protected from erosion. Each of the first and second toe blocks has a respective anchor portion that is rectangular in shape and extends orthogonal to and downwardly from the first and second toe blocks. The anchor portion of each of the first and second toe blocks is adapted for being buried in the ground.

According to yet another embodiment, disclosed are revetment blocks for making a mat having a linear border. The mat includes a plurality of interior revetment blocks, each having two positive interlocking arms and two positive interlocking sockets for engaging with respective neighbor revetment blocks. A first revetment toe block has a positive interlocking socket for engaging with an interlocking arm of one of the interior blocks. The first toe block also has a linear edge without an arm or a socket on a side opposite the interlocking socket of the first toe block. A second revetment toe block has a positive interlocking arm for engaging with an interlocking socket of one of the interior blocks. The second toe block has a linear edge without an arm or a socket on a side opposite the interlocking arm of the second toe block. The first toe block and the second toe block are adapted for laying on a ground surface to be protected from erosion. Each of the first and second toe blocks has a respective anchor portion that is rectangular in shape and extends orthogonal to and downwardly from the first and second toe blocks. The anchor portion of each of the first and second toe blocks is adapted for being buried in the ground.

With regard to a further embodiment of the invention, disclosed is a method of forming a roadway using revetment blocks. The method includes digging spaced-apart trenches in a path of the roadway; installing interior revetment blocks along the path of the roadway between the spaced-apart trenches, where the interior revetment blocks have arms and sockets. The method further includes using revetment toe blocks on opposing sides of the interior revetment blocks, where each toe block includes at least one arm or one socket, and where each revetment toe block is associated with an anchor portion; and installing the anchor block portions of the toe blocks in the spaced-apart trenches, and engaging the arm or socket of the respective toe blocks with the respective socket or arm of the neighbor interior revetment blocks.

BRIEF DESCRIPTION OF THE DRAWINGS

Further features and advantages will become apparent from the following and more particular description of the preferred and other embodiments of the invention, as illustrated in the accompanying drawings in which like reference numbers generally refer to the same parts, functions or elements throughout the views, and in which.

DETAILED DESCRIPTION OF THE INVENTION

Figure 1:
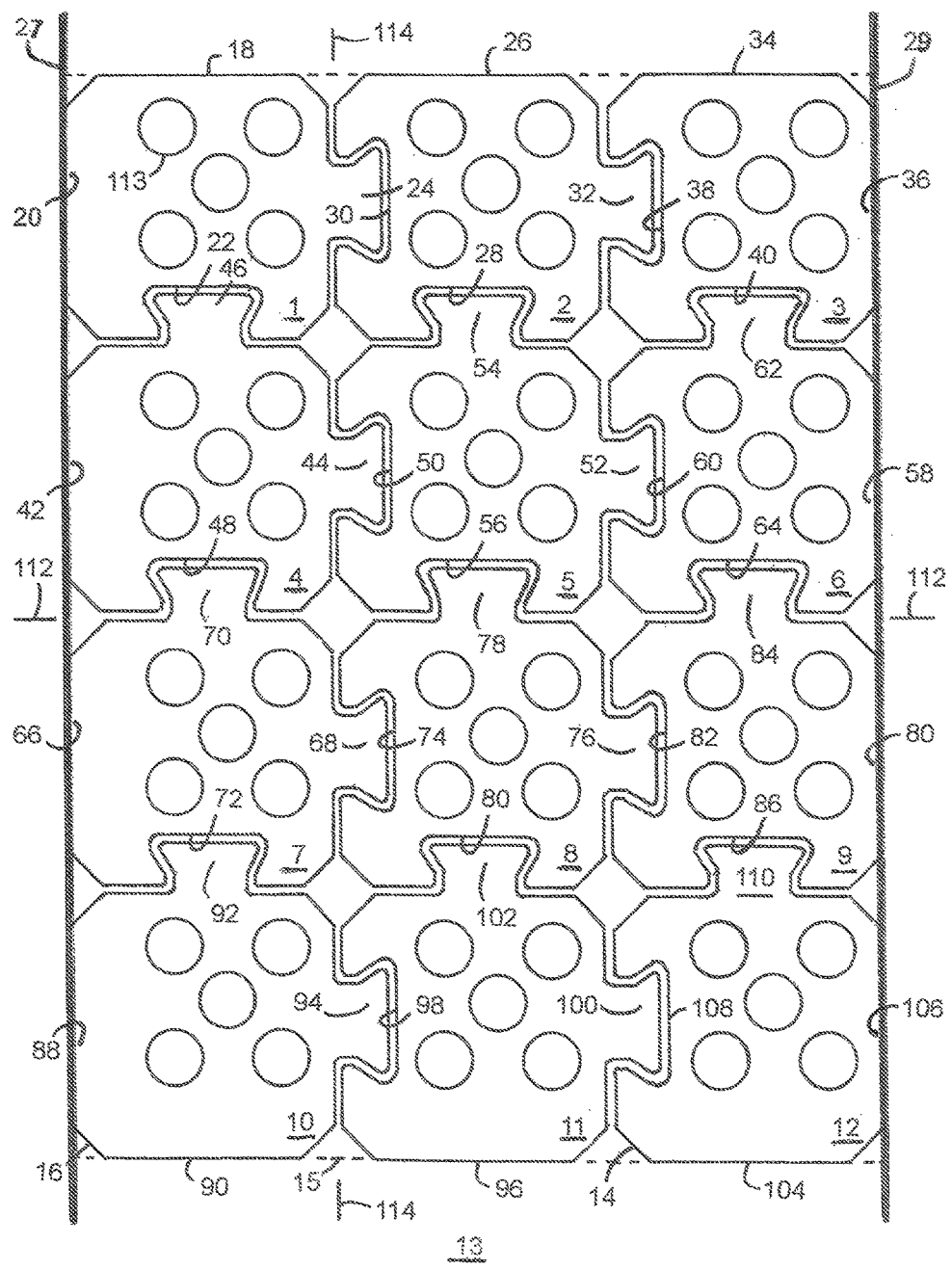
FIG. 1 is a mat of twelve interlocking revetment blocks having a linear border all around the perimeter of the mat.

FIG. 1 illustrates a small twelve-block mat 13 of interlocking revetment blocks. The mat 13 includes a number of different shape blocks in order to achieve a linear perimeter, shown by broken line 15. Although the perimeter 15 is generally linear, it has small indentions 14 where the diagonal corner of neighbor blocks meet. Accordingly, as used herein the term linear generally means that there are two or more blocks interlocked together with no arms or sockets on the selected edges or borders of such interlocked blocks, and the borders can be curved based on the articulation ability of the blocks. The mat 13 also includes diagonal angled corners 16. However, the mat 13 does not include any arms or sockets along the perimeter, as each border block is constructed with one or two linear sides that do not have either an arm or a socket. This prevents the breakage of the border blocks when heavy loads are carried on the unused arms and sockets of the border blocks. For example, the first corner block 1 is a border block and is constructed with a first side 18 and a second side 20 orthogonal thereto, and neither side has an arm or a socket. Rather, such sides are linear. Opposite linear side 18 of the first corner block 1 is an interlocking socket 22, and opposite linear side 20 of the first corner block 1 is an interlocking arm 24. The border of the area to be covered may extend all around the perimeter, but the border may also encompass only one side, two or three sides of the perimeter.

The top edge of border block 2 is constructed with a single linear side 26 that is collinear with the linear side 18 of the first corner block 1. Opposite the linear side 26 of border block 2 is an interlocking socket 28. The border block 2 has a side with a socket 30 that interlocks with the arm 24 of the first corner block 1. Opposite the socket 30 of border block 2 is an interlocking arm 32.

The second corner block 3 is also a border block and is constructed differently from first corner block 1 and border block 2. The second corner block 3 is constructed with a first linear side 34, and a second linear side 36 that is orthogonal to the first linear side 34. The second corner block 3 is constructed with an interlocking socket 38 opposite linear side 36, and an interlocking socket 40 opposite linear side 34. The socket 38 interlocks with arm 32 of the neighbor border block 2.

The side border block 4 is constructed with a single linear side 42 and an interlocking arm 44 opposite the linear side 42. An interlocking arm 46 is constructed on a side of side border block 4, where the arm 46 interlocks with a socket 22 of the first corner block 1. Side border block 4 is constructed with an interlocking socket 48 opposite the interlocking arm 46.

A interior block 5 is one of many interior blocks of a typical mat, and includes an arm or a socket on each side thereof. In particular, interior block 5 includes an interlocking socket 50 that interlocks with the arm 44 of the side border block 4. Interior block 5 includes an interlocking arm 52 formed on a side that is opposite the interlocking socket 50. An interlocking arm 54 is formed on interior block 5 and interlocks with the socket 28 of border block 2. An interlocking socket 56 is formed in block 5 opposite interlocking arm 54. The interior block 5 is constructed differently from border blocks 1-4. Except for the arrangement of vegetation holes formed in interior block 5, the interlocking arms and sockets of interior block 5 are constructed very similar to the revetment block disclosed in U.S. Pat. No. 5,556,228.

Side border block 6 is constructed with a linear side 58 that is collinear with the linear side 36 of the second corner block 3. The side border block 6 is constructed with an interlocking socket 60 opposite the linear side 58, where the interlocking socket 60 interlocks with the interlocking arm 52 of interior block 5. An interlocking arm 62 is formed on side border block 6 and is interlocked with the socket 40 of the second corner block 3. An interlocking socket 64 is formed in side border block 6 opposite the interlocking arm 62.

Side border block 7 is constructed in an identical manner to side border block 4, with a linear side 66 and an interlocking arm 68 extending from a side opposite the linear side 66. The linear side 66 of side border block 7 is collinear with the linear side 42 of side border block 4. The side border block 7 has an interlocking arm 70 that interlocks with the interlocking socket 48 of the side border block 4. An interlocking socket 72 is formed opposite the interlocking arm 70.

Interior block 8 is constructed identical to the interior lock 5. Interior block 8 has an interlocking socket 74 that interlocks with the interlocking arm 68 of side border block 7. An interlocking arm 76 is formed opposite the interlocking socket 74. An interlocking arm 78 of interior block 8 interlocks with interlocking socket 56 of interior block 5, and an interlocking socket 80 is formed in interior block 8 opposite interlocking arm 78.

Side border block 9 is constructed in an identical manner as side border block 6. Side border block 9 includes a linear side 80 that is collinear with the linear side 58 of side border block 6. Side border block 9 is constructed with an interlocking socket 82 that is opposite the linear side 80, and interlocking socket 82 interlocks with interlocking arm 76 of interior block 8. An interlocking arm 84 is interlocked with the interlocking socket 64 of side border block 6. An interlocking socket 86 is formed in side of border block 9 opposite the interlocking arm 84.

The third corner block 10 is a border block and is constructed with a first linear side 88 and a second linear side 90 orthogonal thereto, where neither side has an arm or a socket. Linear side 88 is collinear with side 66 of side border block 7. Opposite linear side 88 of corner block 10 is an interlocking arm 94, and opposite linear side 90 of corner block 10 is an interlocking arm 92 that is interlocked with the socket 72 of side border block 7.

The bottom border block 11 is constructed with a linear side 96 that is collinear with the linear side 90 of the third corner block 10. The bottom border block 11 includes an interlocking arm 100 opposite the interlocking socket 98, and includes an interlocking arm 102 opposite the linear side 96. The interlocking socket 98 interlocks with interlocking arm 94 of the third corner block 10.

Lastly, in the twelve-block mat 13, there is a fourth corner block 12 that is a border block and is constructed with a first linear side 104 that is orthogonal to a second linear side 106. The linear side 104 is collinear with the linear side 96 of bottom border block 11. Similarly, the linear side 106 of the fourth corner block 12 is collinear with the linear side 80 of side border block 9. An interlocking socket 108 is formed in the fourth corner block 12 opposite the linear side 106, and an interlocking arm 110 is formed in the fourth corner block 12 opposite the linear side 104. The interlocking socket 108 interlocks with the interlocking arm 100 of the bottom border block 11. The interlocking arm 110 of the fourth corner block 12 interlocks with interlocking socket 86 of side border block 9.

While the mat 13 includes only twelve interlocking blocks, in practice many more interlocking blocks would be employed to cover a large ground area. A larger mat of interlocking blocks, where the mat has a linear border or perimeter, can be installed by adding additional blocks 4 or 7 in the first column to make the mat as long as desired. The additional side border blocks 4 or 7 would be added in the first column at line 112. In order to make the mat 13 longer, additional interior blocks 5 or 8 would be added in the second column at line 112. The additional interior blocks 5 or 8 would have interlocking sockets that interlock with the respective interlocking arms of the added side border blocks 4 or 7. Lastly, in order to lengthen the mat 13, additional side boarder blocks 6 or 9 would be added at line 112 in the third column of the mat 13. The added side border blocks 6 or 9 would have interlocking sockets that interlock with the respective interlocking arms of the added interior blocks 5 or 8.

Of course, when making a mat of interlocking revetment blocks longer than the mat 13, one would start at the bottom or top of the mat and install as many blocks as necessary until the other end of the mat is reached. The mat 13 can be made wider than the three-block wide mat 13 by adding additional top border blocks 2 at line 114, between corner border blocks 1 and 3. Similarly, the mat 13 can be made wider by adding additional interior blocks 5 between side border blocks 4 and 6, at line 114. The same can take place by adding additional interior blocks 8 between side border blocks 7 and 9 at line 114. A wider mat 13 is achieved by adding additional bottom border blocks 11 between the third and fourth corner blocks 10 and 12, at line 114.

Although the interlocking blocks of the mat 13 can be constructed in different sizes, a preferred embodiment of each of the interlocking blocks has a length/width dimension of 15 inches by 15 inches. The interlocking blocks can be 4.5 inches thick and fabricated with 4,000 psi concrete. A mat of interlocking blocks for making a roadway ten foot wide would be installed with eight blocks across. A roadway fifteen feet wide would be installed with twelve blocks across. A mat 13 of revetment blocks can be installed in abutment with a roadway concrete curb or strip 27 or 29, or other linear edge, so that there is no unused interlocking arms or sockets on the desired borders of the perimeter of the area to be covered.+

As noted above, each interlocking block of a mat 13 is constructed with vegetation holes therein. In a preferred embodiment, each block is formed with five vegetation holes, in the location of the five dots of a gambling dice. The vegetation holes, one shown as numeral 113 in the first corner block 1, are formed in the manner described in U.S. Pat. No. 8,123,435, the disclosure of which is incorporated herein by reference. In general, the vegetation holes are formed as a vertical cone shape, with the larger opening in the bottom of the block. The larger opening in the vegetation holes placed in the bottom of each interlocking block allows the blocks to be better anchored to the ground when the holes are filled with soil, small stones, vegetation, etc. Thus, the interlocking blocks should not be turned upside down and installed.

If those skilled in the art prefer to make the vegetation holes as cylinders with the same size opening in the top and bottom of the blocks, then the blocks can be installed right side up or upside down. If this is desired, then the first corner block 1 can be turned upside down, reoriented and installed in the position of the fourth corner block 12. Similarly, the top border block 2 can be turned upside down, reoriented and installed in the position of side border blocks 6 and 9. Lastly, the side border block 4 can be turned upside down, reoriented and installed in the position of bottom border block 11.

In the linear-border mat 13 of FIG. 1, there are nine different types of interlocking blocks. In the conventional construction of such blocks, in a dry cast block plant process, there would be required nine different molds for making each type of block. This is expensive, as molds constructed of steel for making revetment blocks, are expensive. The cost of a typical mold for block plant fabrication of revetment blocks can range upwardly of $35 k-$40 k.

Figure 2:
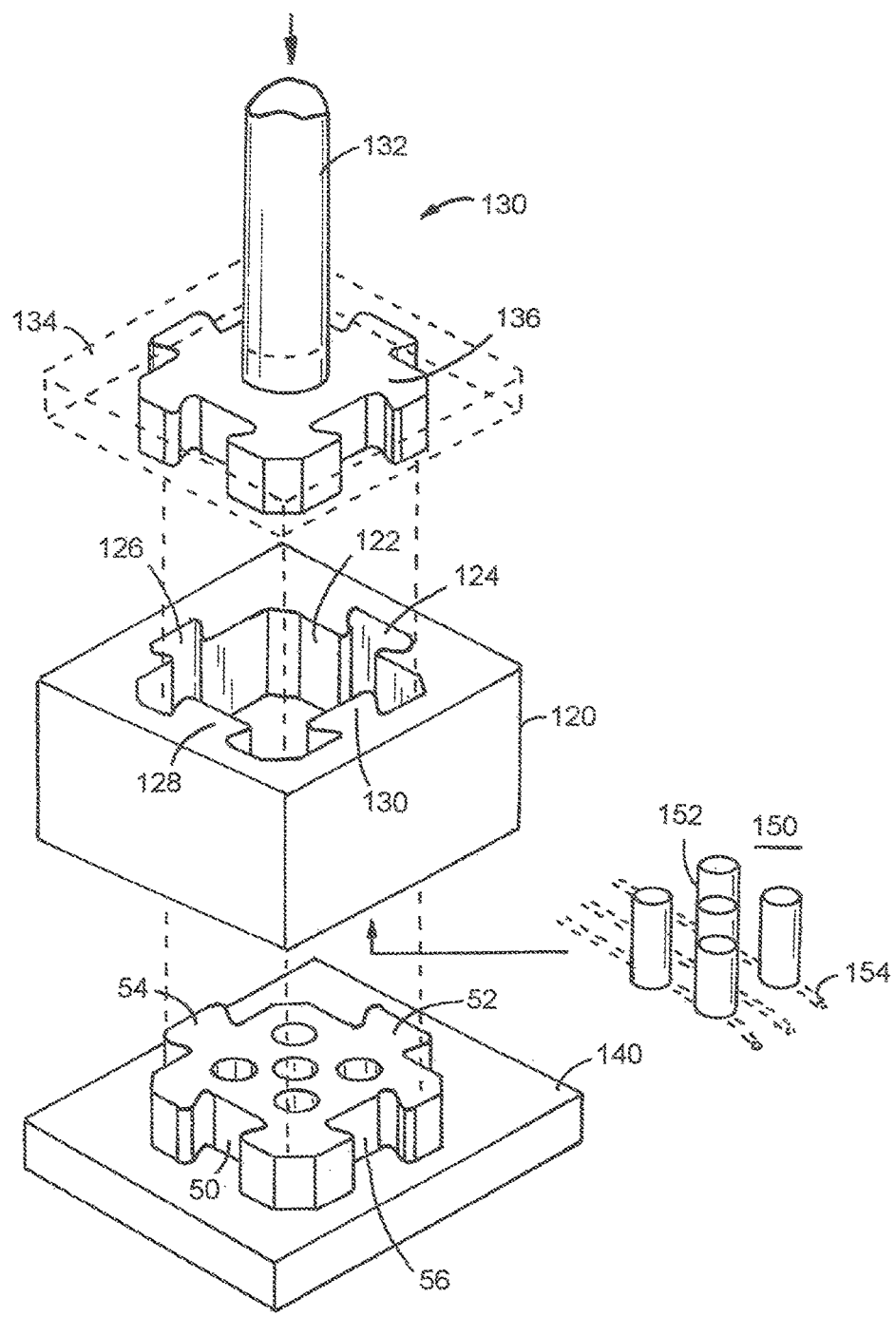
FIG. 2 is an exploded view of various components of a block plant fabrication unit.

FIG. 2 illustrates in rudimentary form the equipment for mass producing revetment blocks using dry cast molds and block plant techniques. The resulting revetment block fabricated is shown as interior block 5 in its completed form after the casting process. According to this technique, a mold box 120 is used, which has a depression with an outer perimeter in the shape of the block to be formed therein, except for the vegetation holes. It can be seen that this mold box 120 is for making the interior block 5 of FIG. 1. The depth of the depression 122 in the mold box 120 is about twice the actual thickness of the interior block 5. The mold box 120 has hollow outwardly-directed depressions 124 and 126 to form the respective interlocking arms 52 and 54 of the interior block 5. Two inwardly-directed arms 128 and 130 in other sidewalls of the depression 122 of the mold box 120 form the two corresponding sockets 50 and 56 in the interior block 5. The mold box 120 is constructed of solid steel and can be used many times to make revetment blocks without replacement or repair due to wear. A small draft angle is formed in the sidewalls of the depression 122 of the mold box 120 to allow the interior revetment block 5 to remain on a metal pallet 140 when the mold box 120 is lifted.

The block plant equipment further includes a reciprocating unit 130 which includes a plunger 132 and a thick square plate 134 (shown in broken lines) attached to the bottom thereof. The plate 134 can be about the size as the top of the mold box 120. A press head 136 is attached to the bottom of the plate 134. The press head 136 is shaped in the outline of the interior block to be formed, and fits down into the top portion of the hollowed out part 122 of mold box 120. As can be appreciated, when making a different shaped revetment block, a different mold box 120 and a corresponding different press head 136 are required. As noted above, the molding apparatus for a different mold box and press head can range upwardly to $35,000 to $40,000.

A further component 150 of the mold box 120 is a set of solid core cans 152 that form the vegetation holes in the interior revetment block 5. This apparatus 150 is shown to the side of the mold box 120, but in practice is welded to the bottom of the mold box 120. The interior block 5 is formed with five vegetation holes, and thus the array of vegetation holes 150 also includes five solid core cans 152. The bottom of each solid core can 152 is attached to a support rod 154 (shown in broken line), and the ends of the support rods 154 are welded to the bottom of the mold box 120. While not shown, the press head 136 is constructed with five cylindrical voids in the bottom thereof to receive therein the core cans 152.

A further component of the block plant system is a movable pallet 140 that underlies the mold box 120. The pallet 140 is a thick steel plate that is laterally moved under the mold box 120 to temporarily form the bottom of the mold box 120. After the interior block 5 is cast in the mold box 120, the mold box 120 is lifted and the molded interior block 5 remains on the pallet 140. The pallet 140 is situated on a conveyor-like apparatus so that it can be moved away from the mold box 120 and downline to allow the interior revetment block 5 to be cured. At the same time, another pallet is moved under the mold box 120, whereupon the mold box 120 is lowered onto the empty pallet 140 and the block casting process is repeated.

In practice, the mold box 120 resting on the pallet 140 is filled with concrete of the desired psi, and with a predetermined amount. In the dry cast technique, the concrete partially filling the mold box 120 has only about 7% water and thus is not runny. Then, the press head 136 is pushed down into the mold box 120 to compress the concrete mix filling the bottom portion of the mold box 120. Additionally, the press head 136 is vibrated to remove all air pockets to assure the integrity and strength of the resulting interior block 5. When the plate 134 above the press head 136 contacts the top of the mold box 120, this is sensed by a sensor (not shown), whereupon the plunger 132 is moved upwardly, bringing with it the plate 134 and the press head 136 attached thereto. Also lifted by means not shown is the mold box 120 so that it is lifted from the pallet 140. The mold box 120 is lifted and separated from the molded interior block 5 which remains on the pallet 140. As noted above, the pallet 140 with the newly-molded interior block 5 resting thereon is moved downline. The procedure is repeated to fabricate another block of the same shape, by lowering the mold box 120 onto a subsequent pallet, partially filling the mold box 120 with fresh concrete, and repeating the process described above.

As illustrated above, there are a number of different revetment blocks needed to provide a linear border around the mat 13 of revetment blocks. A corresponding number of different molds would be required in order to fabricate nine different shaped revetment blocks for the mat 13. This would be prohibitively expensive. In accordance with a feature of the invention, a single mold with replaceable arm/socket members can be utilized to thereby make a universal mold adapted for making different-shaped blocks by attaching or removing the arm/socket members to the body of the mold.

Figure 3:
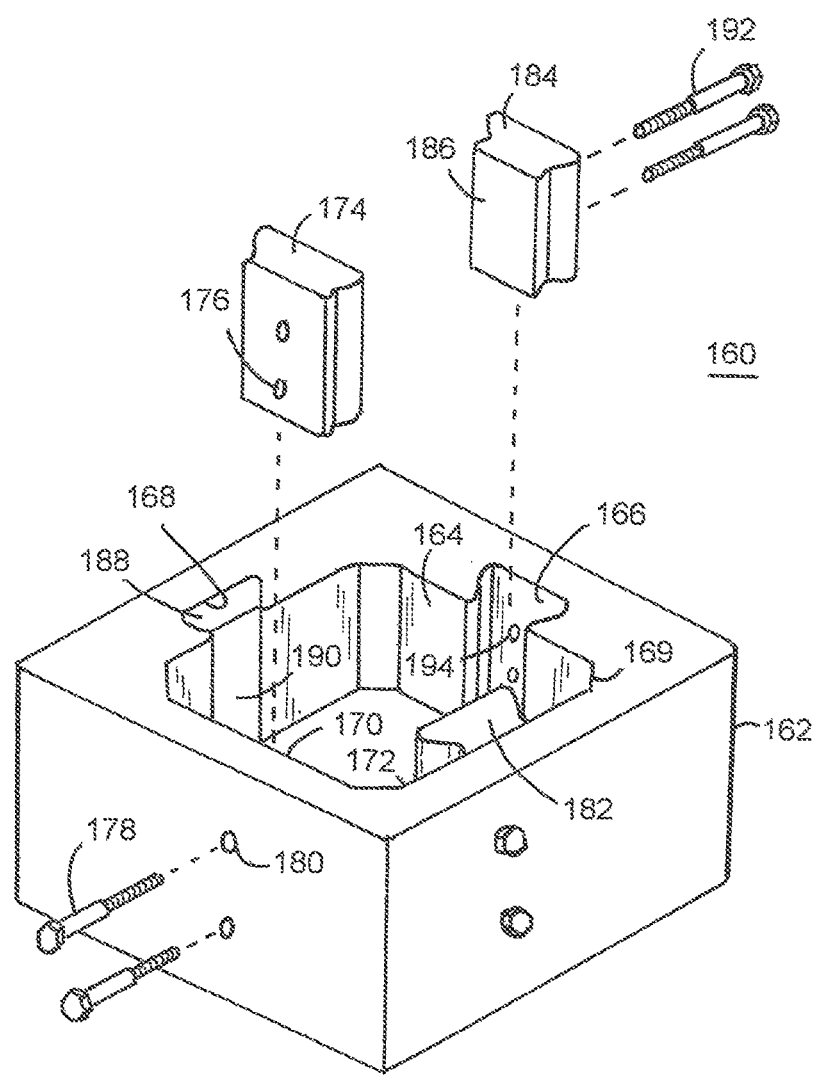
FIG. 3 is an isometric view of a universal mold box adapted for fabricating different shape revetment blocks.

With regard to FIG. 3, there is disclosed a universal mold 160 and the associated components. In particular, the universal mold 160 includes a body 162 having a hollowed out part 164 formed in the basic shape of the perimeter of the block to be formed, including the four angled corners, one shown as numeral 169. The body 162 of the universal mold 160 includes the two outwardly-directed depressions 166 and 168 that would form the corresponding arms 52 and 54 of the interior block 5. As will be described in detail below, the outwardly-directed depressions 166 and 168 can be filled in with respective filler plugs to effectively make the universal mold 160 function to eliminate one or the other of the interlocking arms 52 or 54. Rather than forming the inwardly-directed arms that would otherwise form the sockets 50 and 56 in the interior revetment block 5, the two sides of the depression 164 formed in the mold body 162 are made planar. The planar sides 170 and 172 correspond to the respective planar sides of the border blocks of the mat 13.

The body 162 of the universal mold 160 is constructed to make any of the four sides (excluding the angled corners) planar and without any arm or socket. This is accomplished by making the socket sides 170 and 172 of the mold body 162 planar, as described above. When it is desired to form a socket in either of the two sides 170 and 172, then a socket member 174 is bolted in the position where a socket should be formed in the revetment block. The socket member 174 is shown removed and above the mold body 162 for purposes of clarity. The socket member 174 is formed of steel and has two threaded holes 176 therein. Bolts 178 pass through respective holes 180 formed in the body 162 of the universal mold 160 and are fastened into the threaded holes 176 of the socket member 174. This removably fastens the socket member 174 to the inside surface 170 of the mold body 162. With this arrangement, this side 170 of the mold body 162 can be modified to be either a planar side when the socket member 174 is removed, or a socket when the socket member 174 is bolted to the mold body side 170. The socket member 182 is shown bolted in position to the mold body side 172. In like manner, when the socket member 182 is removed, the side 172 of the mold body depression 164 is planar.

The mold body 162 includes an outwardly-extending depression 166 that otherwise forms an arm 52 of the revetment block to be formed. An arm member 184 has a shape substantially like that of the outwardly-extending depression 166, but has a planar side 186. When the arm member 184 is inserted into the depression 166, it fills the depression 166 and provides an inside planar side 186 that is coplanar with the sidewall of the depression 164 of the mold body 162. The other outwardly-extending depression 168 of the mold body 162 is shown with an arm member 188 inserted therein, and the planar side 190 of the arm member 188 is coplanar with the respective side of the mold body 162. The arm member 184 is fastened within the outwardly-extending depression 166 using bolts 192 inserted through respective holes in the mold body 162 and threaded into threaded holes (not shown) in the arm member 184.

As can be seen, the mold body 162 is formed so that two sides 170 and 172 are normally planar and can be made into corresponding sockets by bolting respective socket members 174 and 182 thereto. Conversely, the other two sides of the mold body 162 are formed so that such sides are constructed with normally outwardly-extending depressions 166 and 168 for forming corresponding arms of the revetment block, but have arm members 184 and 188 inserted therein to make the respective mold body sides planar.

Figure 4:
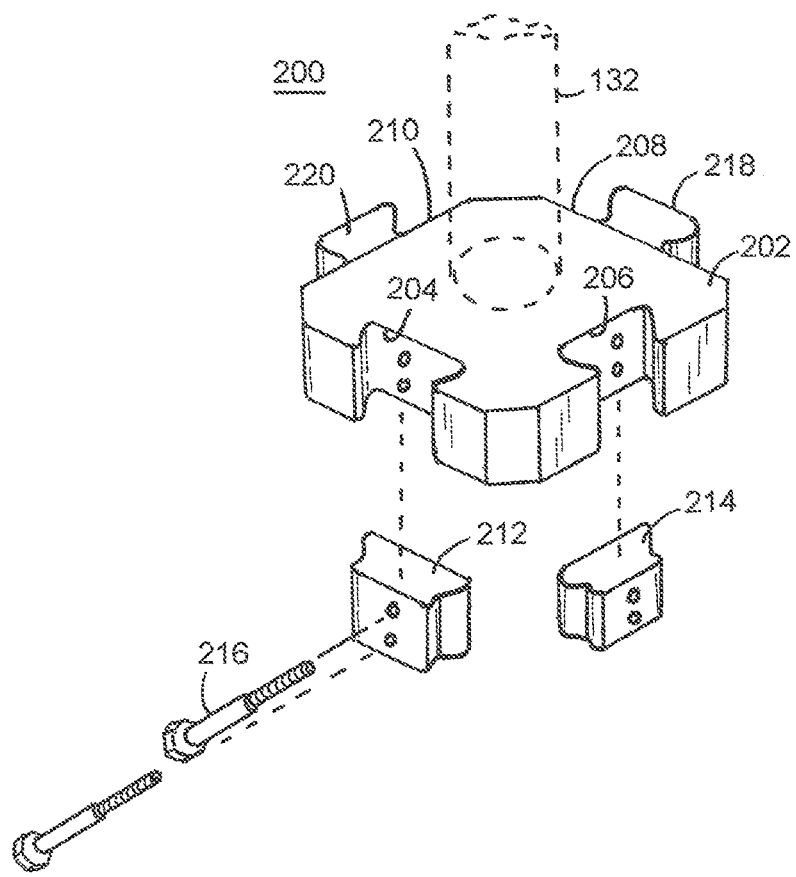
FIG. 4 is an isometric view of a universal press head for use with the universal mold box of FIG. 3.

The press head 200 shown in FIG. 4 (without the overlying plate 134) can also be constructed so as to be universal in making the different shapes of revetment blocks. The press head 200 can function in conjunction with the universal mold 160. The press head 200 includes a body 202 that is the same general shape of the block to be made so that it presses down on the wet concrete in the mold body 162 to compress the wet concrete of the block. The press head body 202 can thus be constructed in the same shape as the hollowed out part 164 formed in the mold box 162, having two sockets 204 and 206, and two planar sides 208 and 210. Socket members 212 and 214 are insertable into the respective sockets 204 and 206 and bolted thereto by bolts 216. Corresponding arm members 218 and 220 are boltable to the planar sides 208 and 210. The insertable socket members 212 and 214 as well as the arm members 218 and 220 are used to modify the outline shape of the press head body 202 for correspondence to the manner in which the mold box 162 is modified. In other words, when there is no arm member 184 inserted into the outwardly-directed depression 166 of the mold body 162, then there would be an arm member 218 bolted to the corresponding position in the press head body 202. Thus, when the outwardly-extending depression 166 in the mold body 162 is vacant and filled with concrete, the corresponding arm member 218 attached to the press head body 202 would come down and compress the concrete that partially fills the outwardly-extending depression 166 in the mold body 162 and form an arm. The same would be true with the use or nonuse of the arm member 220 attachable to the press head body 202 in the position corresponding to the removable arm member 188 of the mold body 162.

A socket member 212 shaped much like socket member 174 can be fastened to the press head body 202 in the location corresponding to mold body side 170. The socket member 174 is slightly larger than the arm member 184 of the mold body 162 to make a block that allows a desired degree of articulation between mating arms and sockets of neighboring revetment blocks. If the socket member 174 is bolted to the side 170 of the mold body 162, then the similar-shaped socket member 212 would not be bolted into the socket 204 of the corresponding side of the press head body 202. On the other hand, if the socket member 174 was not bolted to the side 170 of the mold body 162 to form a planar surface, then the socket member 212 would be bolted into the corresponding socket 204 of the press head body 202. The same would be the case when the socket member 214 is used or not used on the side of the press head body 202 corresponding to the side of the mold body 172 to which the socket member 182 is shown attached. With this socket member arrangement, when a planar side 170 of the mold body 162 has no socket member attached thereto, the press head body 202 does, whereby the wet concrete adjacent the planar side 170 of the mold body 162 will be compacted appropriately.

When fabricating the interior blocks 5 and 8 of FIG. 1, the molding apparatus would be modified according to the following. Since the interior block 5 has two arms and two sockets, then the arm members 184 and 188 would be removed from the corresponding outwardly-extending depressions 166 and 168 of the mold box 162, and both arm members 218 and 220 would be bolted to the respective planar sides 208 and 210 of the press head 202. The two arm members 218 and 220 of the press head 200 would thus come down into the mold box body 162 and into the corresponding sockets 166 and 168 to compress the concrete arm members 52 and 54 of the block 5. Outwardly-extending arms 52 and 54 would thus be formed on the interior block 5. When forming the two sockets 50 and 60 of the interior block 5, the two socket members 174 and 182 would be bolted to the respective planar sides 170 and 172 of the mold body 162. The press head 202 would be configured so that both arm members 212 and 214 would be removed from the respective sockets 204 and 206. The sockets 50 and 60 of the interior block 5 would thus be formed.

In forming, for example, the border block 9 which has an arm 84, two sockets 82 and 86 and a linear side 80, the universal mold 160 would be configured as follows. The arm member 188 would not be bolted into the depression 168 of the mold body 162 so that the arm 84 of the border block 9 would be formed. The arm member 220 would be bolted to the press head body 202 to compress the concrete in the socket 168 of the mold body 162. The arm member 184 would be bolted in the outwardly-extending depression 166 of the mold body 162 and the arm member 218 of the press head body 202 would be removed so that a corresponding arm would not be formed in the border block 9. The linear side 80 of the border block 9 would thus be formed instead of an arm. Since the border block 9 has two sockets 82 and 86, both socket members 174 and 182 would be bolted to the respective sides 170 and 172 of the mold body 162, thereby causing two sockets 82 and 86 to be formed in the border block 9. The press head body 202 would be modified so that the arm members 212 and 214 would be removed to receive therein the respective arm members 174 and 182 of the mold body 162. The border block 9 would thus be formed by the universal mold 160.

From the foregoing, a universal mold 160 is disclosed so that it can be used to fabricate different shape interlocking revetment blocks using the same general mold body, by attaching or removing various socket or arm members therefrom. The foregoing has been described in connection with a preferred embodiment in which interlocking revetment blocks are constructed and installed in a mat. Those skilled in the art may apply the teachings disclosed herein to construct revetment blocks and other types of blocks with arms and sockets that interengage, but do not positively interlock to prevent lateral separation.

Figure 5:
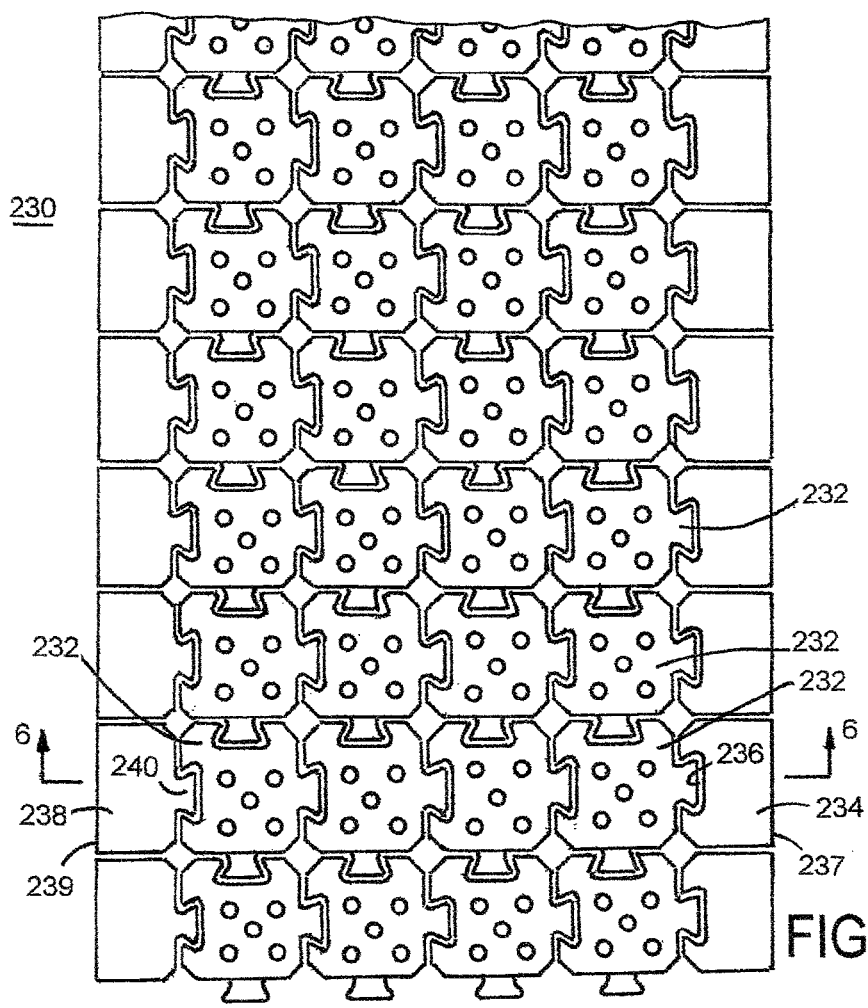
FIG. 5 is a top view of a mat of revetment blocks having interior revetment blocks and opposing edge revetment blocks having respective linear edges.
Figure 6:
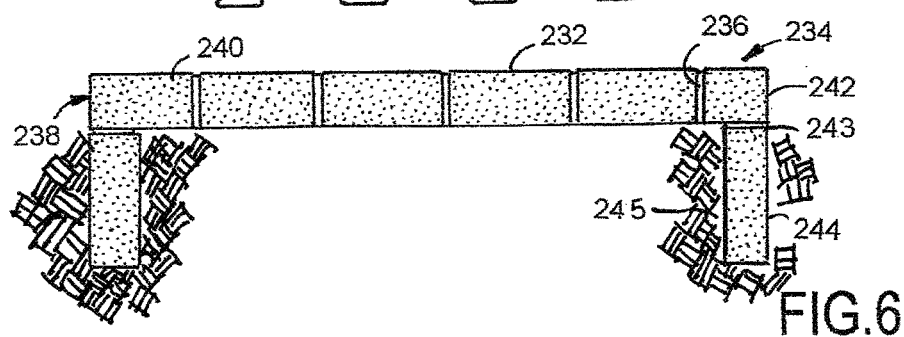
FIG. 6 is a cross-sectional view of the mat of revetment blocks taken along line 6-6 of FIG. 5.
Figure 7:
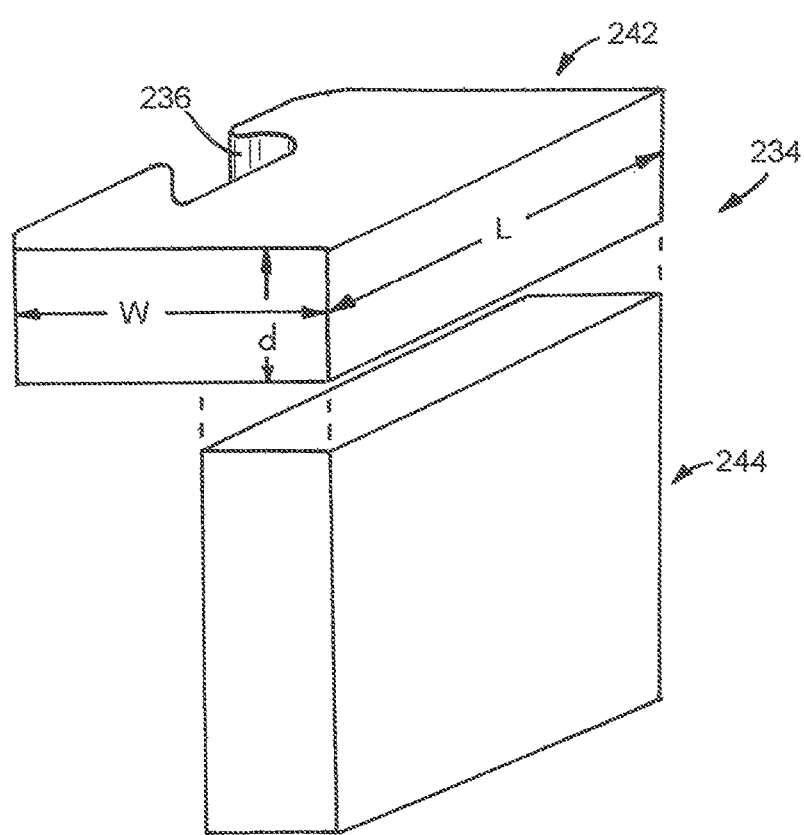
FIG. 7 is an isometric view of an edge revetment block having an interlocking part and an anchor part.

FIGS. 5-7 illustrate another embodiment of a mat 230 of revetment blocks, where the blocks are installed within a border of spaced-apart toe blocks 234 and 238. The interior revetment blocks, one shown as 232, are constructed with two interlocking arms and two interlocking sockets, much like the interior blocks 5 described above. The interlocking interior revetment blocks 232 provide an excellent roadway adjacent to an area where water can occasionally flow and provide the possibility of erosion. According this embodiment, the mat 230 of interior blocks 232 has a first border constructed of toe blocks 234, each of which has an interlocking socket 236 formed therein. A second and oppositely-located border is constructed of toe blocks 238, each of which has an interlocking arm 240.

The respective sockets 236 the first border of toe blocks 234 interlock with the corresponding arms of the interior blocks 232. The linear outer side 237 of the toe blocks 234 forms a straight or linear edge to the road. In like manner, the socket of each interior block 232 forming the opposite side of the road, interlocks with a corresponding arm 240 of a neighbor toe block 238. Each toe block 234 is constructed with one socket 236 and three linear sides, one of which is the outer side 237 of the toe block 234. Each toe block 238 is similarly constructed with one arm 240 and three linear sides, one of which is the outer side 239 of the toe block 238. With this arrangement of toe blocks 234 and 238, each side of the mat 230 of interior blocks 232 is constrained within the lateral area between the respective rows of toe blocks.

The details of the construction of the toe block 234 is illustrated in FIGS. 6 and 7. The purpose of the toe blocks 234 and 238 is to anchor the sides of the mat 230 in the ground and prevent the erosion of soil by water attempting to flow under either side of the mat 230. The toe block 234 is constructed with two parts. Atop interlocking part 242 of the toe block 234 has the interlocking socket 236 and is substantially the same size and thickness as the neighbor interior block 232. In practice, the socket 236 of the toe block 234 is somewhat larger than the arm of the interior block 232 to allow a desired degree of articulation between the neighbor blocks. An anchor part 244 of the toe block 234 has a length substantially the same as the interlocking part 242, but is narrower in width. The length is measured into the drawing, and the width is measured sideways in the drawing of FIG. 6, and the depth of the anchor part 244 is measured up and down in the drawing of FIG. 6. For clarity, these dimensions are set forth in FIG. 7 also. The anchor part 244 of the toe block 234 is buried in the ground, and preferably in a trench 245 formed along the side of the road to be paved with the mat 230. The depth of the anchor part 244 of the toe block 234 can be about 13.5 inches to thereby substantially reduce the possibility of water eroding under the mat 230 and compromising the integrity and stability thereof. The other toe block 238 is constructed in a substantially similar manner, except with an interlocking arm 240, rather than an interlocking socket 236.

The row of toe blocks 234 remain adjacent each other due to the interlocking connection between the neighbor interior blocks 132. However, those skilled in the art may find it advantageous in some applications to provide the capability for each toe block 234 in the row to interlock with each other using respective sockets and arms. The same could be with the other row of toe blocks 238. Also, each toe block 234 and 238 is constructed with interior beveled corners, but this is not a necessity to the proper function of the toe blocks 234 and 238. The beveled corners of the toe blocks 234 and 238 provide an opening at the corner intersection between blocks to facilitate the growth of vegetation and anchoring of the blocks and the mat 230 to the underlying ground.

With reference to FIG. 7, there is illustrated the interlocking part 242 of the toe block 234, as well as the anchor part 244. In practice, the toe block 234 is constructed in two parts by block plant techniques, using respective molds. Three different molds can be utilized, one for molding the interlocking socket part 242 of the toe block 234, a second mold for making the interlocking arm part 240 of the other toe block 238, and a third mold for making the anchor part 244 of both toe blocks 234 and 238. As noted above, the interior revetment blocks are about 15 inches by 15 inches and 4.5 inches thick (depth). The interlocking part 242 of the toe block 234 is made compatible with the interior blocks 232 by constructing the interlocking part 242 about fifteen inches wide, about twelve inches long and about 4.5 inches thick (depth). The anchor part 244 of the toe block 234 is constructed about 4.5 inches wide, about twelve inches long and about 13.5 inches in depth. Those skilled in the art may find that the interior blocks 232 and the toe blocks 234 and 238 can be constructed with other dimensions.

When fabricating the toe blocks 234 and 238 using a mold and block plant techniques, it is expected that such block can be made more efficiently in two parts 242 and 244 and then fixing the two parts together before being installed in an interlocking manner with the interior blocks 232. As such, the interlocking part 242 is first made using the first mold, and then the anchor part 244 is made using a different mold. Then, the interlocking part 242 is attached to the anchor part 244 by a layer of mortar 243 therebetween. When the mortar has cured, the interlocking part 242 is thus fixed to the anchor part 244. The other toe block 238 is fabricated in a similar manner. Of course, when a certain mold is fixed to the block plant equipment, many corresponding toe block parts would be molded before changing the mold to make the other toe block parts.

When constructing a road, such as a conventional ten foot wide road, using a mat of interlocking blocks, the following steps can be carried out. Two six-inch wide trenches can be formed in each boundary path of the road, where the outer edges of the two trenches are ten feet apart. A first lateral row of interior blocks 232 are then installed in an interlocking manner between the two trenches, and the anchor parts 244 of the toe blocks 234 and 238 are then lowered into the respective trenches and at the same time interlocked with the respective neighbor interior blocks 232. The space between the anchor parts of toe blocks 234 and 238 and the inside of the trenches can be backfilled with dirt. The space between the outside surface of the anchor parts 244 and the outer edge of the trenches can be backfilled with dirt at that time, or at any later time when the road is completed. Subsequent lateral rows of interior blocks 232 and toe blocks 234 and 238 are thus installed, with the second row of interior blocks interlocked with the neighbor interior blocks. With this technique, a road is provided for carrying the load of vehicles thereon, the edges are linear and aesthetically pleasing, and the edges of the road are protected from erosion thereunder by flowing water during flooding or otherwise.

While the preferred and other embodiments of the invention have been disclosed with reference to specific revetment blocks, and associated methods of construction and installation thereof, it is to be understood that many changes in detail may be made as a matter of engineering choices without departing from the spirit and scope of the invention, as defined by the appended claims.

What is claimed is:

1. A mat made of revetment blocks having a linear border, comprising:
    a plurality of interior revetment blocks, each having two engaging arms and two engaging sockets for engaging with respective neighbor revetment blocks;
    a first revetment toe block having a socket for engaging with an arm of one said interior block, said first toe block having a linear edge without an arm or a socket on a side opposite the socket of said first toe block;
    a second revetment toe block having an arm for engaging with a socket of one said interior block, said second toe block having a linear edge without an arm or a socket on a side opposite the arm of said second toe block; and
    said first toe block and said second toe block adapted for laying on a ground surface to be protected from erosion, each said first and second toe blocks having a fixedly attached anchor block that is rectangular in shape and extends orthogonal to and downwardly from the first and second toe blocks, the anchor block of each said first and second toe blocks adapted for being buried in the ground.

2. The mat of revetment blocks of claim 1, wherein said first toe block is attached to a first said anchor portion with a layer of mortar, and said second toe block is attached to a second said anchor portion with a layer of mortar.

3. The mat of revetment blocks of claim 2, wherein said first toe block is attached to a first said anchor portion with a layer of mortar before being installed, and said second toe block is attached to a second said anchor portion with a layer of mortar before being installed.

4. A roadway comprised of the mat revetment blocks of claim 1, further including spaced-apart trenches formed along a path of the roadway, and said anchor blocks buried in the respective trenches.

5. The roadway of claim 4, wherein the first and second revetment toe blocks form respective linear edges of the roadway.

6. The roadway of claim 5, wherein the linear edges of the revetment toe blocks are formed with a mold.

7. The mat of revetment blocks of claim 1, wherein each revetment toe block has a given length that is the same as a length of a respective anchor block attached thereto.

8. A roadway comprised of the mat of revetment blocks of claim 1, wherein the roadway is designed to carry vehicle traffic.

9. The roadway of claim 8, wherein said roadway is anchored to the ground by said anchor blocks.

10. The roadway of claim 8, wherein the arms and sockets of the blocks are articulated sufficiently so that the roadway can be curved.

11. A mat made of revetment blocks having a linear border, comprising:
    a plurality of interior revetment blocks, each having two positive interlocking arms and two positive interlocking sockets for engaging with respective neighbor revetment blocks;
    a first revetment toe block having a positive interlocking socket for engaging with an interlocking arm of one said interior block, said first toe block having a linear edge without an arm or a socket on a side opposite the interlocking socket of said first toe block;
    a second revetment toe block having a positive interlocking arm for engaging with an interlocking socket of one said interior block, said second toe block having a linear edge without an arm or a socket on a side opposite the interlocking arm of said second toe block; and
    said first toe block and said second toe block adapted for laying on a ground surface to be protected from erosion, each said first and second toe blocks having a fixedly attached anchor block that is rectangular in shape and extends orthogonal to and downwardly from the first and second toe blocks, the anchor block of each said first and second toe blocks adapted for being buried in the ground.

12. The mat of revetment blocks of claim 11, wherein said anchor portions are attached to the respective first and second toe blocks with a layer of mortar.

13. A roadway comprised of the mat revetment blocks of claim 11, further including spaced-apart trenches formed along a path of the roadway, and said anchor blocks buried in the respective trenches.

14. The roadway of claim 13, wherein the first and second revetment toe blocks form respective linear edges of the roadway.

15. A method of forming a roadway using revetment blocks, comprising:
    digging spaced-apart trenches in a path of the roadway;
    installing interior revetment blocks along the path of the roadway between the spaced-apart trenches, where the interior revetment blocks each have arms and sockets;
    using revetment toe blocks on opposing sides of the interior revetment blocks, where each toe block includes at least one arm or one socket, and where each revetment toe block is associated with an anchor portion; and installing the anchor portions of the toe blocks in the spaced-apart trenches, and engaging the arm or socket of the respective toe blocks with the respective socket or arm of the neighbor interior revetment blocks.

16. The method of claim 15, further including using revetment blocks with positive interlocking arms and sockets for the roadway.

17. The method of claim 15, further including associating the revetment toe blocks with the respective anchor portions by attaching each revetment toe block to a respective anchor portion with a layer of mortar.

* * * * *